(12) United States Patent
Michelson et al.

(10) Patent No.: US 7,169,086 B2
(45) Date of Patent: Jan. 30, 2007

(54) WRIST TRAINER FOR PIANO INSTRUCTION

(76) Inventors: Gail Michelson, 1365 Vallecito Pl., Carpinteria, CA (US) 93013; Bruce Maurer, 334 Carlo Dr., Goleta, CA (US) 93117

( * ) Notice: Subject to any disclaimer, the term of this patent is extended or adjusted under 35 U.S.C. 154(b) by 319 days.

(21) Appl. No.: 10/907,325

(22) Filed: Mar. 29, 2005

(65) Prior Publication Data

US 2006/0229165 A1   Oct. 12, 2006

(51) Int. Cl.
*A63B 22/00* (2006.01)
(52) U.S. Cl. .............. 482/51; 482/44; 84/328; 248/118
(58) Field of Classification Search ........... 482/44–47, 482/51, 148; 601/40; 84/328, 453; 248/118, 248/1, 118.3
See application file for complete search history.

(56) References Cited

U.S. PATENT DOCUMENTS

| | | | | |
|---|---|---|---|---|
| 5,082,258 A | * | 1/1992 | Niks | ............... 84/469 |
| 5,465,931 A | * | 11/1995 | MacDonald | ............. 248/118.3 |
| 5,567,067 A | * | 10/1996 | Ambrose | .............. 400/472 |
| 5,753,840 A | * | 5/1998 | Saboia De Albuquerque | .......... 84/453 |
| 6,271,452 B1 | * | 8/2001 | Bernard | ............. 84/453 |
| 6,325,342 B1 | * | 12/2001 | Dignat | ............. 248/118 |

* cited by examiner

*Primary Examiner*—Jerome W. Donnelly
*Assistant Examiner*—Tam Nguyen
(74) *Attorney, Agent, or Firm*—Laura N Tunnell

(57) ABSTRACT

The present invention relates to a device for teaching the proper position of a user's wrist while paying the piano. The device includes a rod and two supports. The rod is long enough to span the length of a piano keyboard. The rod is deployed in a way that encourages proper positioning of the wrist by simply occupying the space that would otherwise be occupied by an incorrectly positioned wrist. The two support pieces are positioned at both ends of the keyboard and fit snugly over its surface. A trough for supporting the weight of the piano rod is configured into each of the support pieces.

2 Claims, 4 Drawing Sheets

WRIST TRAINER FOR PIANO INSTRUCTION

The art of piano playing cannot be fully realized without proficiency in the skill of piano playing. However, in order to attain the required level of skill, one must consciously optimize the mechanics of arm, hand and finger movement. The fingers must have the necessary degrees of freedom at all times in order to execute the demands of musical performance. The wrist and forearm only occasionally contribute to the musicality of a piece, usually to aid in the execution of a forte passage by virtue of their weight.

In general, all functions exterior to the execution of proper key strike must be performed by muscles that do not interfere with the key strike. Execution of the light and agile passage such as the left hand $16^{th}$ octaves in the middle section of Chopin's Grand Polonaise in E-flat major are an excellent example of the usage of this principle. Here, the fingers and hand must remain unburdened by anything that does not contribute to the speed and accuracy of the recurrent chordal pattern. The weight of the wrist and forearm must be supported by muscles above the region of activity, i.e., the hands and fingers, leaving them free to move in accordance with the demands of the music. Essentially, the wrist and forearm must remain in a plane above that of the piano keys, moving only laterally to enable stepwise progression of the $16^{th}$ octave pattern. Although the Chopin passage is a stressing example of the need to maintain such an activity heirarchy, the rule is true for all serious piano playing and must be taught from a very early age.

This is a difficult concept to instill in the young student. A child's hands are small and their muscles are not fully developed. Moreover, a child is playing an adult sized instrument that is built for the comfort level of an adult pianist. More often than not, the child's wrist and forearm end up positioned at a level at or below the level of the keyboard. Every time the child moves the wrist, the hand must support a significant amount of the weight of the hand/wrist/forearm system. The hands and fingers end up supporting and controlling weight as well as attempting to execute proper key strike. Moreover, the available operating space is crowded by the presence of the wrist and upper forearm. This action interferes with proficient movement and eventually degrades musical quality.

Occasionally, the weight of the hand and forearm are used to punctuate a musical passage with volume and intensity. In order for this to be efficiently done, the forearm, wrist and hand must move as one unit, maintaining the same internal configuration and before and not allowing any internal collapse. Again, the weight of the forearm/wrist/hand system is controlled by the strength of a solid configuration of forearm and wrist.

In short, habits adopted at an early age will make or break the foundations of a pianist's technique. Consequently, there is a need in the art for a device that aids in the proper positioning of hand, wrist and forearm for young piano students.

SUMMARY

The present invention relates to a device for teaching the proper position of the wrist while paying the piano. The device comprises a rod and two supports. The rod must be long enough to span the length of a piano keyboard. The rod is deployed in a way that encourages proper positioning of the wrist by simply by occupying the space that would otherwise be occupied by an incorrectly positioned wrist. The two support pieces are positioned at the both ends of the keyboard and fit snugly over its surface. A trough for supporting the weight of the piano rod is configured into each of the support pieces. Means is included for slight adjustment of the rod height to accommodate needs of the individual.

DESCRIPTION OF THE PREFERRED EMBODIMENTS

BRIEF DESCRIPTION OF THE DRAWINGS

FIG. 5 indicates the dimensions of the rod support.

DESCRIPTION OF NUMBERS USED IN THE DRAWINGS

10—piano key
11—fulcrum of piano key
12—pianists's shoulder
13—pianists's upper arm
14—pianists's elbow
15—pianists's forearm
16—pianists's wrist
17—pianists's hand
18—pianists's fingers
19—pianists's back
20—cross section showing position and shape of piano rod
30—piano
31—rod support
50—rod support dimension—1.5 inches
51—rod support dimension—1.125 inches
52—rod support dimension—1.0 inches
53—rod support dimension—0.875 inches
54—rod support dimension—6.5 inches
55—rod support dimension—6.0 inches
56—rod support dimension—4.25 inches
57—rod support dimension—4.5 inches
58—means for adjusting the height of the rod

DESCRIPTION OF THE PREFERRED EMBODIMENTS

Figure 1:
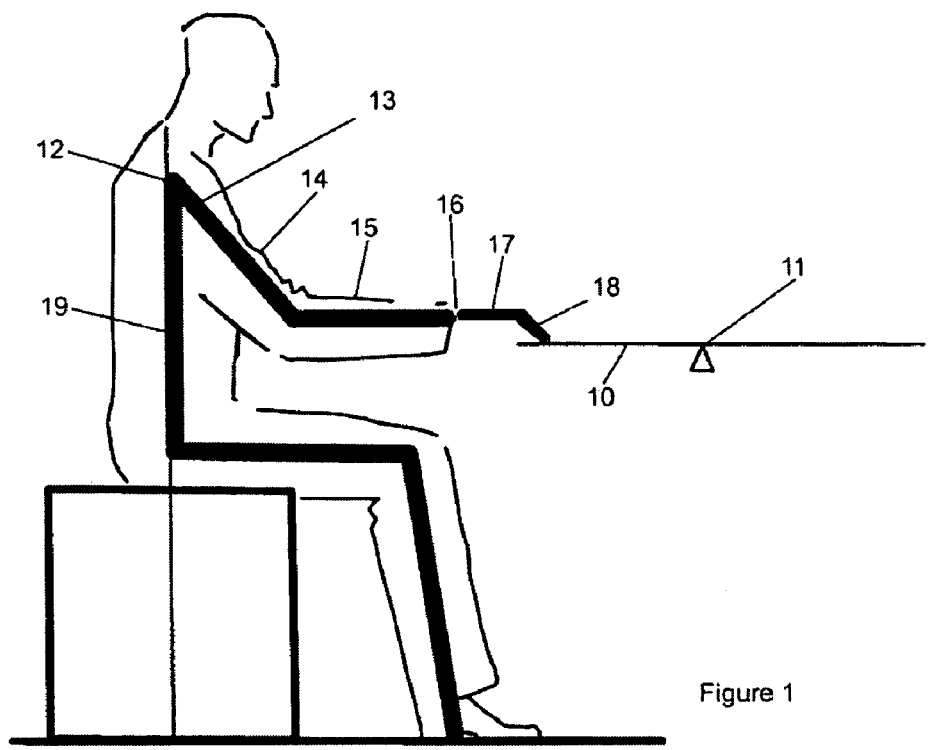
FIG. 1 illustrates correct alignment and interrelationship of various body components.

On a very rudimentary level, a pianist's goal is to exercise efficient and complete control over the duration and intensity of each strike of a piano key (10) indicated notionally in FIG. 1. Such key strikes are essentially a force applied to a lever, in this case the key (10), rotating about a fixed point, the fulcrum of the key (11). However, the duration and dynamics of this force must span an extreme great enough that, when combined as a whole, transforms a maze of sounds into an experience perceived by the listening audience to have that intangible quality known as music.

To accomplish this goal, the entire body must act in consort; parts of the body take a passive role while other parts take an active role. In general, the interrelationship of the body components can be described as a system of levers joined together by pivot points. The upper arm (13) is attached to the forearm (15), by means of the elbow (14), which acts as a pivot. By the same token, the forearm (15) is attached to the hand (17) by means of the wrist (16). Stability of the forearm (15)/wrist (16)/hand (17) system is the focus of the present invention.

Figure 2A:
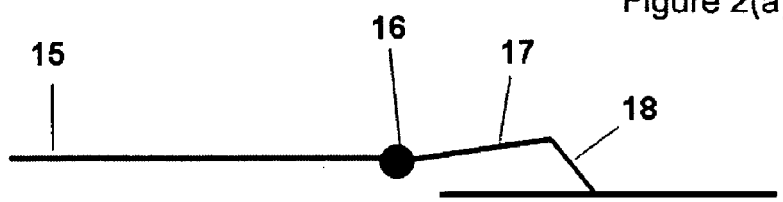
FIG. 2 shows a closeup of the forearm/wrist/hand interrelationship
Figure 2B:
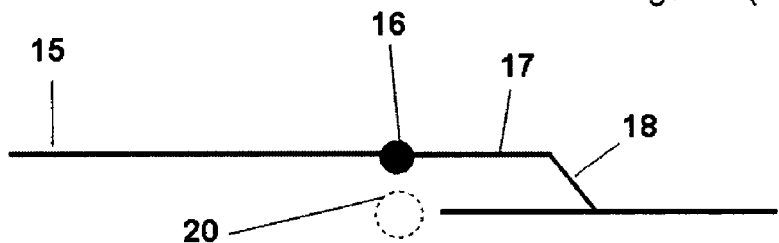

FIG. 2 is a closeup illustration of the forearm (15)/wrist (16)/hand (17) interrelationship. The incorrect position is indicated in (a). Note the sagging of the wrist (16). The correct position, shown in (b) of the same figure, has been encouraged by use of the piano rod (20) shown here in cross section. In essence, the piano rod crowds the area that would be otherwise comfortably occupied by a sagging wrist. The wrist (16) remains solid and positioned inline with the both levers (forearm and hand) on either side thereby optimising the strength and efficiency of the forearm (15)/wrist (16)/hand (17) system by enabling it to operate as a single contiguous unit.

Figure 3:
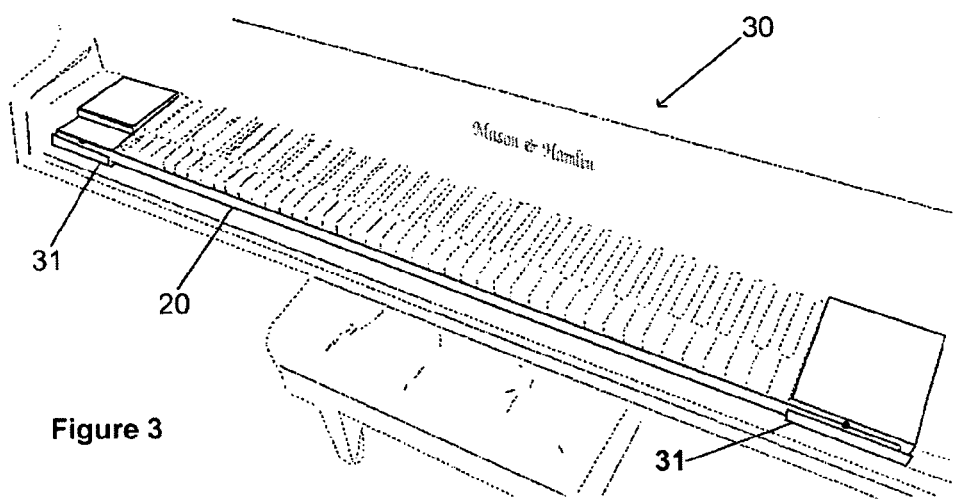
FIG. 3 shows the wrist rod and two rod supports placed on a piano keyboard.
Figure 4:
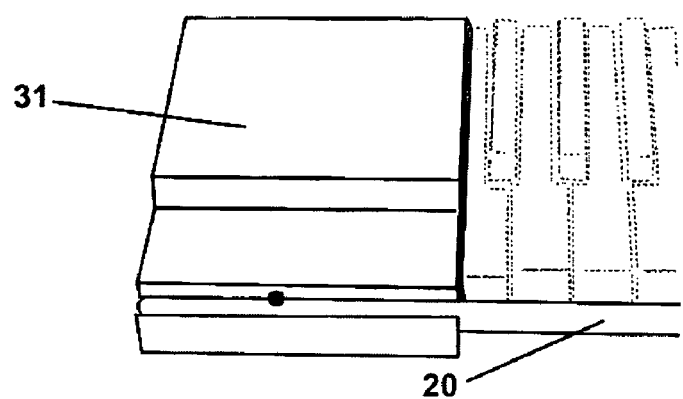
FIG. 4 is a close-up of the rod support.

The piano rod (20), designed to discourage this habit, is shown deployed on a piano (30) in FIG. 3. The weight of the rod is supported at both ends by a means of a rod support (31) contoured to snug the piano keys. This is shown in more detail in FIG. 4.

FIG. 5 shows an end on view of a rod support (31). The rightmost "L" shaped portion prevents the support from sliding off the piano keys. The area denoted by width (54) accommodates the volume of both white and black piano keys. The white keys are further accomodated by width (55). The actual support segment is the leftmost "U" shaped channel surrounding the piano rod (20). The height of the rod can be fine-tuned by adjustment means (58) such as a screw, placed underneath the rod.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A device adapted to be coupled to a piano for teaching the proper position of a user's wrist while playing the piano, the device comprising:

a first contoured support adapted to fit snugly over the keys at one end of a piano's keyboard and a second contoured support adapted to fit snugly over the keys at the other end of the piano's keyboard; and a rod having a first end coupled to the first support and a second end coupled to the second support, wherein each support includes a trough portion for receiving an end of the rod, a bent portion that snugly fits over a front portion of the piano's white keys, another bent portion that fits over the front a portion of the piano's black keys and a "L"-shaped portion that fits over a back portion of the piano keys to prevent the supports from slipping off the piano keys when the rod is placed within the troughs to provide the user with proper wrist positioning while playing the piano.

2. The device of claim 1 wherein each support further includes a means for adjusting the height of the rod.

* * * * *